United States Patent
Leong et al.

(10) Patent No.: US 12,039,111 B1
(45) Date of Patent: Jul. 16, 2024

(54) OPTICAL NAVIGATION METHOD AND OPTICAL NAVIGATION DEVICE

(71) Applicant: PixArt Imaging Inc., Hsin-Chu (TW)

(72) Inventors: Keen-Hun Leong, Penang (MY); Keng Yeen Lye, Penang (MY); Sai Mun Lee, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 18/196,420

(22) Filed: May 11, 2023

(51) Int. Cl.
G06F 3/03 (2006.01)
G06F 3/0354 (2013.01)

(52) U.S. Cl.
CPC ........ *G06F 3/0317* (2013.01); *G06F 3/03543* (2013.01)

(58) Field of Classification Search
None
See application file for complete search history.

(56) References Cited

FOREIGN PATENT DOCUMENTS

KR  20090011841 A  *  2/2009

OTHER PUBLICATIONS

Translation of KR-20090011841-A into English; Cho et al. (Year: 2009).*

* cited by examiner

*Primary Examiner* — Brian M Butcher
(74) *Attorney, Agent, or Firm* — Winston Hsu (57) ABSTRACT

An optical navigation method, applied to an optical navigation device, comprising: (a) recording a first motion prediction of the optical navigation device; (b) determining if a surface which the optical navigation device is moving on is trackable; and (c) loading the first motion prediction recorded in the step (a) if the surface is non-trackable and then becomes trackable.

18 Claims, 7 Drawing Sheets

OPTICAL NAVIGATION METHOD AND OPTICAL NAVIGATION DEVICE

BACKGROUND OF THE INVENTION

1. Field of the Invention

The present invention relates to an optical navigation method and an optical navigation device, and particularly relates to an optical navigation method and an optical navigation device which can compensate the motion prediction when the optical navigation device moves across a non-trackable surface.

2. Description of the Prior Art

A conventional optical sensor calculates changes in position (i.e., calculate motion) by optically acquiring sequential surface images of a surface (e.g., a desk surface). By comparing these sequential images, the optical sensor can mathematically determine the direction and the magnitude of a motion.

For a trackable surface, such as a surface has rich features, the images captured by the optical sensor have a sufficient high brightness and a sufficient high contrast. On the opposite, for a non-trackable surface, such as a surface which is optically absorptive and/or smooth, the images captured by the optical sensor may not have a sufficient high brightness and a sufficient high contrast to enable the accurate mathematical calculations needed to determine a direction and a magnitude of a motion.

Also, in order to achieve a tracking with a high efficiency and a high speed, a motion prediction methodology is employed, where a direction and a magnitude of a motion from previous images are used to predict a direction and a magnitude of a current motion. Such prediction assists in the mathematical calculation and enables faster processing of the images.

As above-mentioned, if the optical sensor is on a non-trackable surface, the captured images do not have a sufficient high brightness and a sufficient high contrast for the optical sensor to calculate a magnitude and a direction of motion. In such case, the optical sensor will report a motion prediction even with a zero magnitude even if the optical sensor is still moving over the non-trackable surface.

Accordingly, if the optical sensor moves from a trackable surface to a non-trackable surface, the optical sensor will report a determined direction and a determined magnitude of the motion while moving on the trackable surface, but a motion with a zero magnitude while moving on the non-trackable surface.

As the optical sensor then goes to a trackable surface again (while still in motion), the images captured by the optical sensors have a sufficient high brightness and a sufficient high brightness to enable the calculation of a motion. However, due to a motion with the zero magnitude which is acquired while the optical sensor is moving on the non-trackable surface, the optical sensor is unable to predict the actual direction and magnitude of motion, even though the images already have a sufficient high brightness and a sufficient high contrast.

SUMMARY OF THE INVENTION

One objective of the present invention is to provide an optical navigation method which can compensate the motion prediction when the optical navigation device moves across a non-trackable surface.

Another objective of the present invention is to provide an optical navigation device which can compensate the motion prediction when the optical navigation device moves across a non-trackable surface.

Another objective of the present invention is to provide an optical navigation system which can compensate the motion prediction when the optical navigation device moves across a non-trackable surface.

One embodiment of the present invention discloses an optical navigation method, applied to an optical navigation device, comprising: (a) recording a first motion prediction of the optical navigation device; (b) determining if a surface which the optical navigation device is moving on is trackable; and (c) loading the first motion prediction recorded in the step (a) if the surface is non-trackable and then becomes trackable.

Another embodiment of the present invention discloses an optical navigation device, comprising: a processing circuit; and an optical sensor, configured to perform following steps: (a) recording a first motion prediction of the optical navigation device; (b) determining if a surface which the optical navigation device is moving on is trackable; and (c) loading the first motion prediction recorded in the step (a) if the surface is non-trackable and then becomes trackable.

Still another embodiment of the present invention discloses an optical navigation system, comprising: an electronic device; and an optical navigation device, connected to the electronic device, comprising: a processing circuit; and an optical sensor; wherein the optical sensor determines if a surface which the optical navigation device is moving on is trackable; wherein the electronic device records a first motion prediction of the optical navigation device, and loads the first motion prediction which is recorded if the surface is non-trackable and then becomes trackable.

In view of above-mentioned embodiments, the motion prediction interrupted by the non-trackable surface can be compensated. Accordingly, the tracking of the optical mouse can be smooth even if the optical mouse moves across a non-trackable surface.

These and other objectives of the present invention will no doubt become obvious to those of ordinary skill in the art after reading the following detailed description of the preferred embodiment that is illustrated in the various figures and drawings.

DETAILED DESCRIPTION

In the following descriptions, several embodiments are provided to explain the concept of the present application. It will be appreciated that the system, the device, the apparatus or the module depicted in following embodiments can be implemented by hardware (ex. circuit) or the combination of hardware and software (ex. a processing unit executing at least one program). The term "first", "second", "third" in following descriptions are only for the purpose of distinguishing different one elements, and do not mean the sequence of the elements. For example, a first device and a second device only mean these devices can have the same structure but are different devices.

Figure 1:
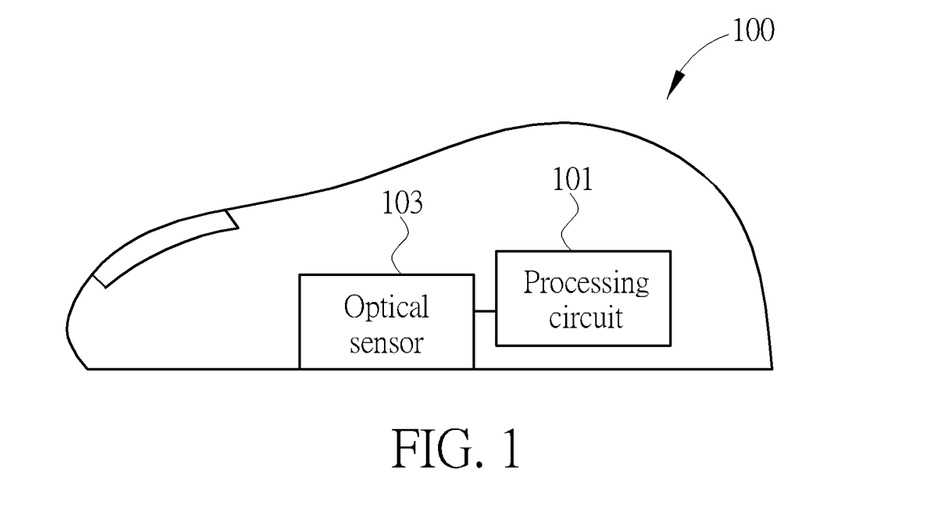
FIG. 1 is a block diagram illustrating an optical navigation device according to one embodiment of the present invention.

FIG. 1 is a block diagram illustrating an optical navigation device according to one embodiment of the present invention. Please note, in following embodiments, an optical mouse 100 is used as an example for explaining the concepts of the present invention. However, the optical mouse can be replaced by any other optical navigation device. As illustrated in FIG. 1, the optical mouse 100 comprises a processing circuit 101 and an optical sensor 103. The optical sensor 103 is configured to sense optical data. The optical data can be images, or any other optical data comprising optical feature.

The processing circuit 101 is configured to compute motions of the optical mouse 100 based on the optical data, and configured to output the motion. For example, the optical mouse 100 is connected to a computer and outputs the motions thereof to the computer. Also, the processing circuit 101 may be configured to compute the above-mentioned motion prediction. Please note, the computation of the motion and the motion prediction can be performed by the optical sensor 103 rather than limited to the processing circuit 101. In following embodiments, the optical sensor 103 is configured to perform some operations of the optical navigation method provided by the present invention. However, these operations can also be performed by the processing circuit 101

Figure 2:
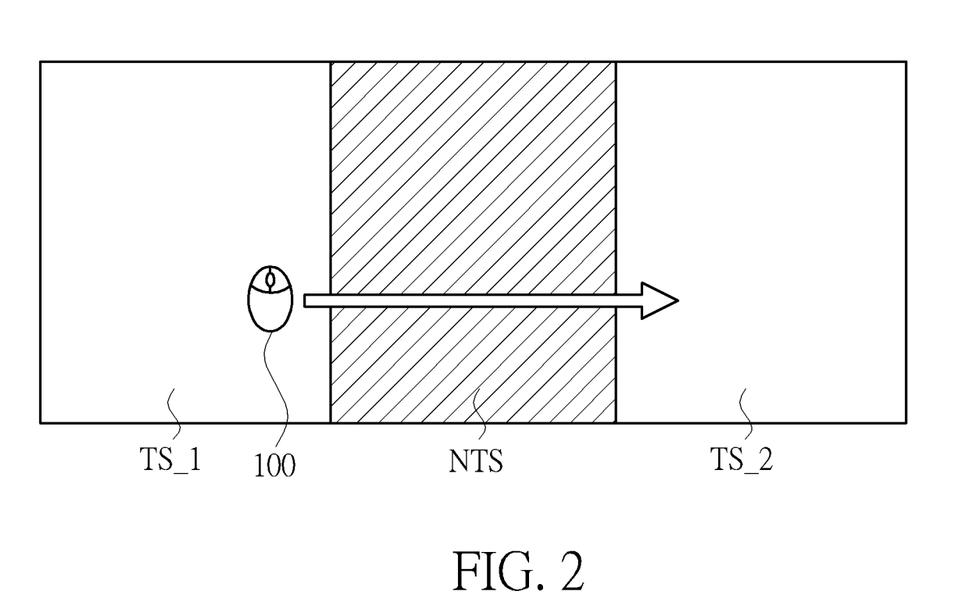
FIG. 2 is a schematic diagram illustrating an optical navigation method according to one embodiment of the present invention.
Figure 3:
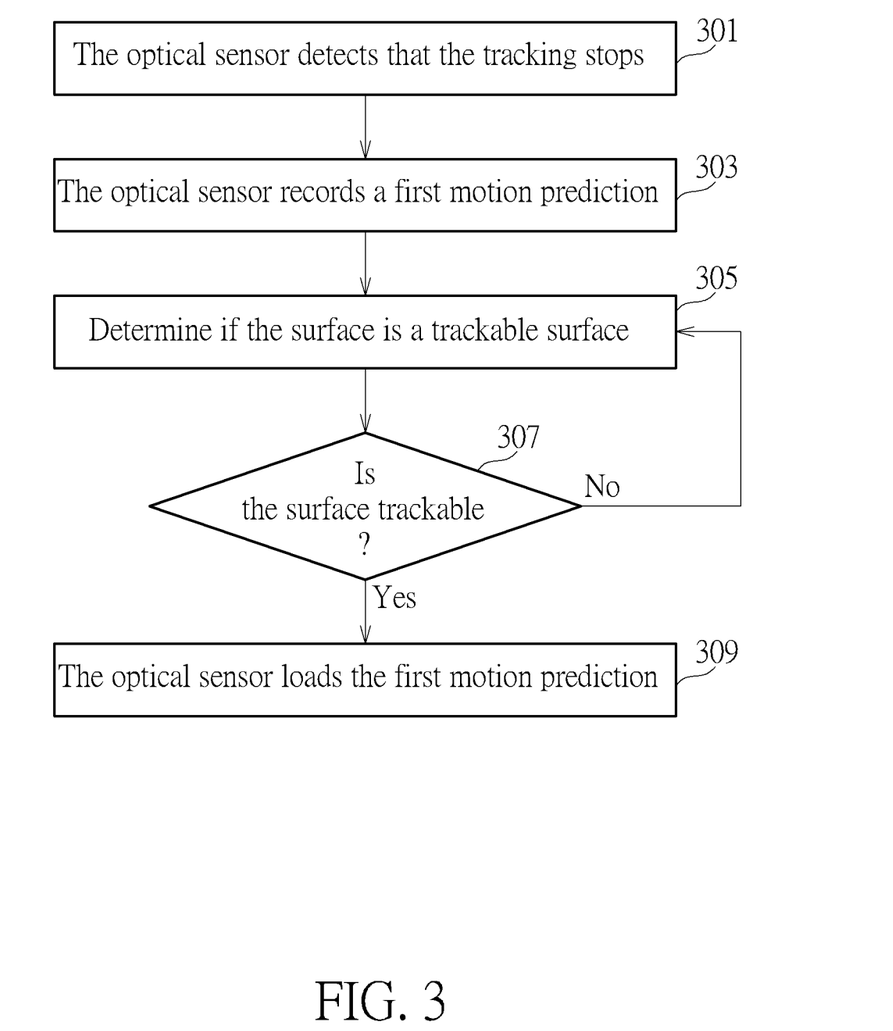
FIG. 3 is a flow chart illustrating the optical navigation method illustrated in FIG. 2.

FIG. 2 is a schematic diagram illustrating an optical navigation method according to one embodiment of the present invention. FIG. 3 is a flow chart illustrating the optical navigation method illustrated in FIG. 2. Please also refer to FIG. 3 while referring to FIG. 2, to understand the concepts of the present invention for more clarity. In FIG. 2, the optical mouse 100 moves from a trackable surface TS_1 to a non-trackable surface NTS, and then to a trackable surface TS_2.

In one embodiment, the optical mouse 100 continuously performs tracking in the embodiment of FIG. 2. The tracking means the above-mentioned operation of "calculate changes in position". The tracking can be successfully performed if the optical mouse 100 is moving on the trackable surface TS_1 or the trackable surface TS_2. However, the tracking stops (could not be successfully computed) if the optical mouse 100 is moving on the non-trackable surface NTS (step 301). In the embodiment of FIG. 2, the stop of tracking can be detected by the optical sensor 103. In such case, the optical sensor 103 records a first motion prediction which is a last successful motion prediction before the optical mouse 100 enters the non-trackable surface NTS (step 303). The first motion prediction may comprise a motion direction and a motion magnitude.

In one embodiment, the optical sensor 103 continuously determines if the surface on which the optical mouse 100 performs a tracking is a trackable surface (step 305), or starts to determine if the surface is a trackable surface when or after the first motion prediction is recorded. Accordingly, the step 303 can be regarded as: "records a first motion prediction which is a last successful motion prediction before the optical mouse 100 determines the surface is non-trackable".

As above-mentioned, the optical sensor 103 determines if the surface is a trackable surface. Accordingly, in the step 307 of FIG. 3, the procedure goes back to the step 305 if the surface is still a non-trackable surface (i.e., the optical mouse 100 is still moving on the non-trackable surface NTS). Also, in the step 307 of FIG. 3, if the surface becomes a trackable surface (i.e., the optical mouse 100 moves to the trackable surface TS_2), the optical sensor 103 loads the first motion prediction (step 309). After that, the optical sensor 103 the optical sensor 103 performs tracking according to acquired optical data and the first motion prediction. By this way, the computation of motion predictions is not interrupted by the non-trackable surface NTS.

In one embodiment, the optical mouse 100 is connected to an electronic device, which is responsible for compensating the motion prediction when the optical mouse 100 moves across the non-trackable surface NTS. The electronic device can be a computer or any other electronic device which can perform the operations illustrated in FIG. 4 and FIG. 5. Besides, the connection between the optical mouse 100 and the electronic device can be a wireless connection or a wired connection.

Figure 4:
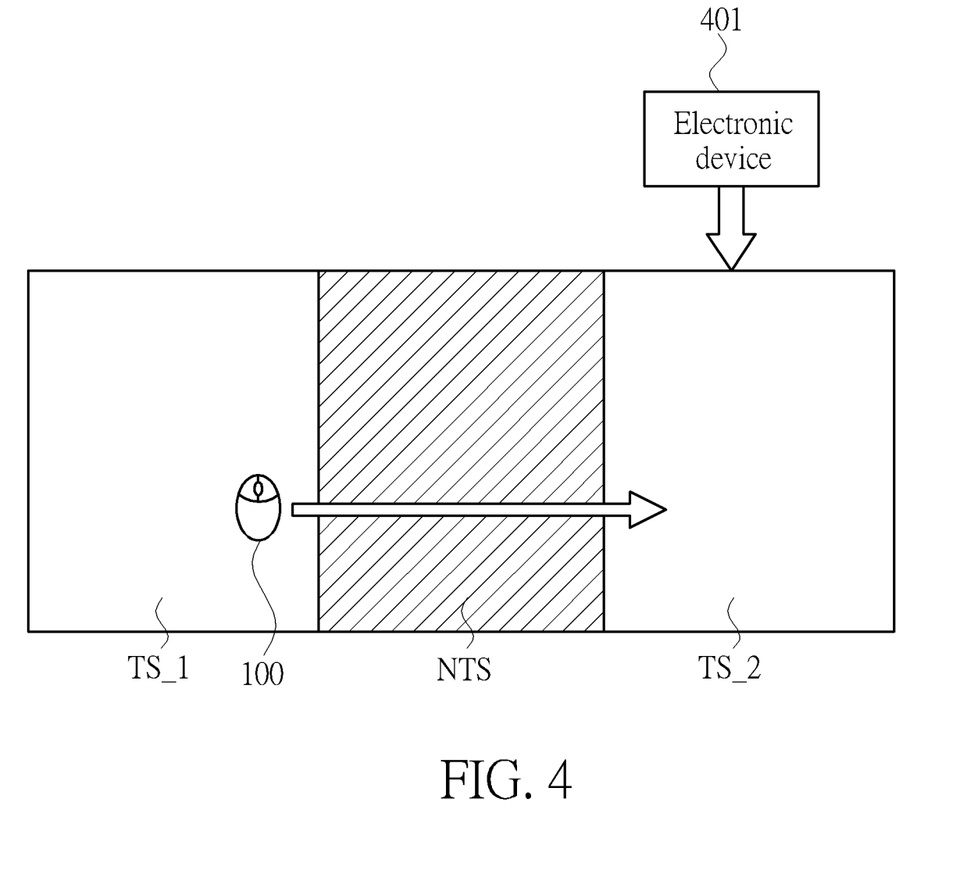
FIG. 4 is a schematic diagram illustrating an optical navigation method according to another embodiment of the present invention.
Figure 5:
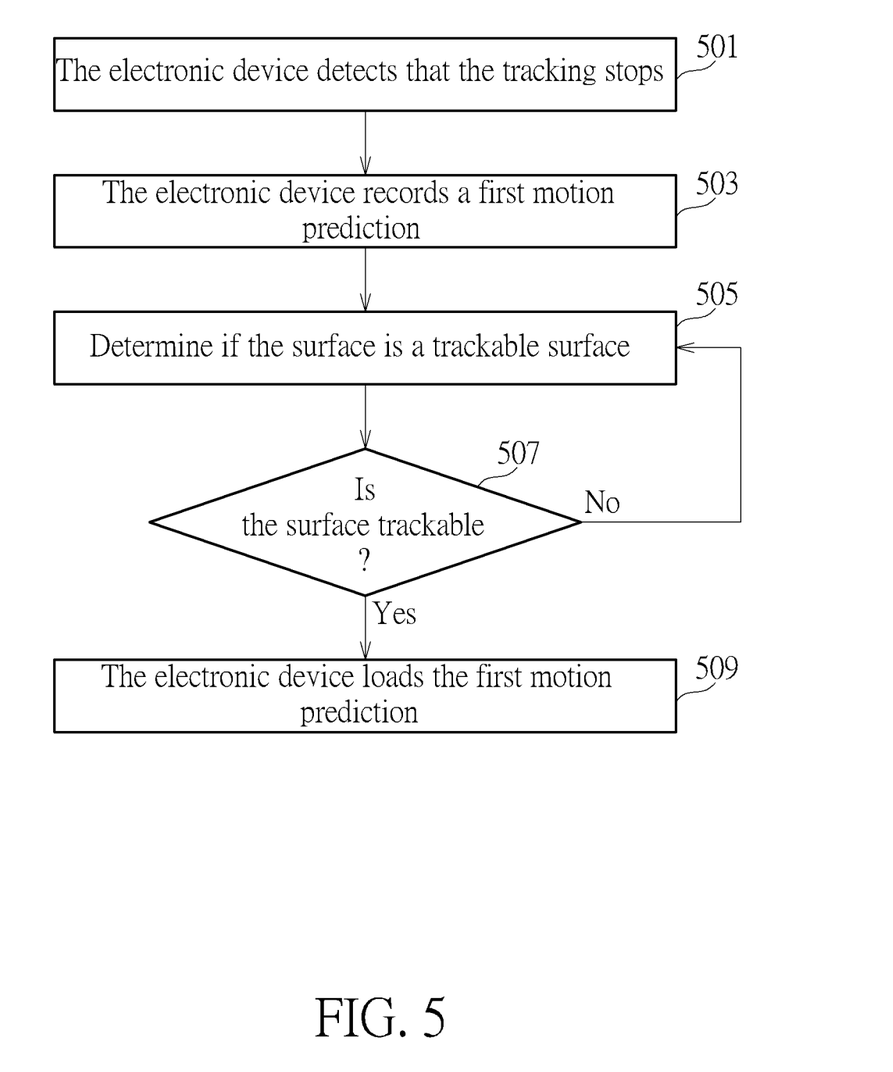
FIG. 5 is a flow chart illustrating the optical navigation method illustrated in FIG. 4.

FIG. 4 is a schematic diagram illustrating an optical navigation method according to one embodiment of the present invention. FIG. 5 is a flow chart illustrating the optical navigation method illustrated in FIG. 4. Please also refer to FIG. 5 while referring to FIG. 4, to understand the concepts of the present invention for more clarity. In FIG. 4, the optical mouse 100, which is connected with an electronic device 401, moves from a trackable surface TS_1 to a non-trackable surface NTS, and then to a trackable surface TS_2. The optical mouse 100 and the electronic device 401 can be regarded as an optical navigation system.

In one embodiment, the optical mouse 100 continuously performs tracking in the embodiment of FIG. 4. The tracking means the above-mentioned operation of "calculate changes in position". The tracking can be successfully performed if the optical mouse 100 is moving on the trackable surface TS_1 or the trackable surface TS_2. However, detects the tracking stops (could not be successfully computed) if the optical mouse 100 is moving on the non-trackable surface NTS (step 501). In the embodiment of FIG. 4, the stop of tracking can be detected by the electronic device 401.

In such case, the electronic device 401 records a first motion prediction which is a last successful motion prediction before the optical mouse 100 enters the non-trackable surface NTS (step 503). The first motion prediction may comprise a motion direction and a motion magnitude. In one embodiment, a microprocessor of the electronic device 401 records the first motion prediction before the optical mouse 100 enters the non-trackable surface NTS.

In one embodiment, the optical sensor 103 continuously determines if the surface on which the optical mouse 100 performs a tracking is a trackable surface (step 505), or starts to determine if the surface is a trackable surface when or after the first motion prediction is recorded. Accordingly, the step 503 can be regarded as: "records a first motion prediction which is a last successful motion prediction before the optical sensor 103 determines the surface is non-trackable".

As above-mentioned, the optical sensor 103 determines if the surface is a trackable surface. Accordingly, in the step 507 of FIG. 5, the procedure goes back to the step 505 if the surface is still a non-trackable surface (i.e., the optical mouse 100 is still moving on the non-trackable surface NTS). Also, in the step 507 of FIG. 5, if the surface becomes a trackable surface (i.e., the optical mouse 100 moves to the trackable surface TS_2), the electronic device 401 loads the first motion prediction and transmits the first motion prediction to the optical sensor 103 (step 509). After that, the optical sensor 103 performs tracking according to acquired optical data and the first motion prediction. By this way, the computation of motion predictions is not interrupted by the non-trackable surface NTS.

In above-mentioned embodiments, the optical mouse 100 moves from a trackable surface TS_1 to a non-trackable surface NTS, and then to a trackable surface TS_2. However, in some embodiments, the user may change the moving direction of the optical mouse 100, such that the optical mouse 100 moves from a trackable surface TS_1 to a non-trackable surface NTS, and turns back to the trackable surface TS_1 again. For example, the optical 100 has a U turn as show in FIG. 6. In such case, the above-mentioned embodiments may still acquire a wrong motion prediction since the optical mouse 100 has changed it's moving direction but still use the first motion prediction which is recorded before the moving direction changes.

Figure 6:
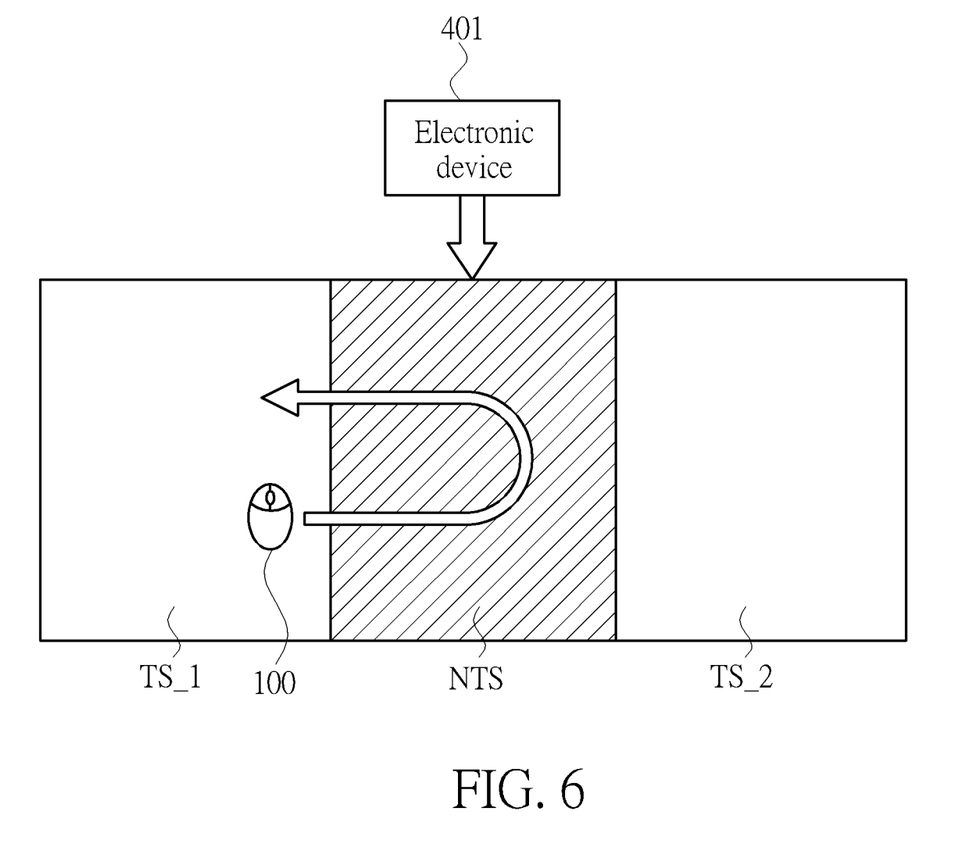
FIG. 6 is a schematic diagram illustrating an optical navigation method according to another embodiment of the present invention.
Figure 7:
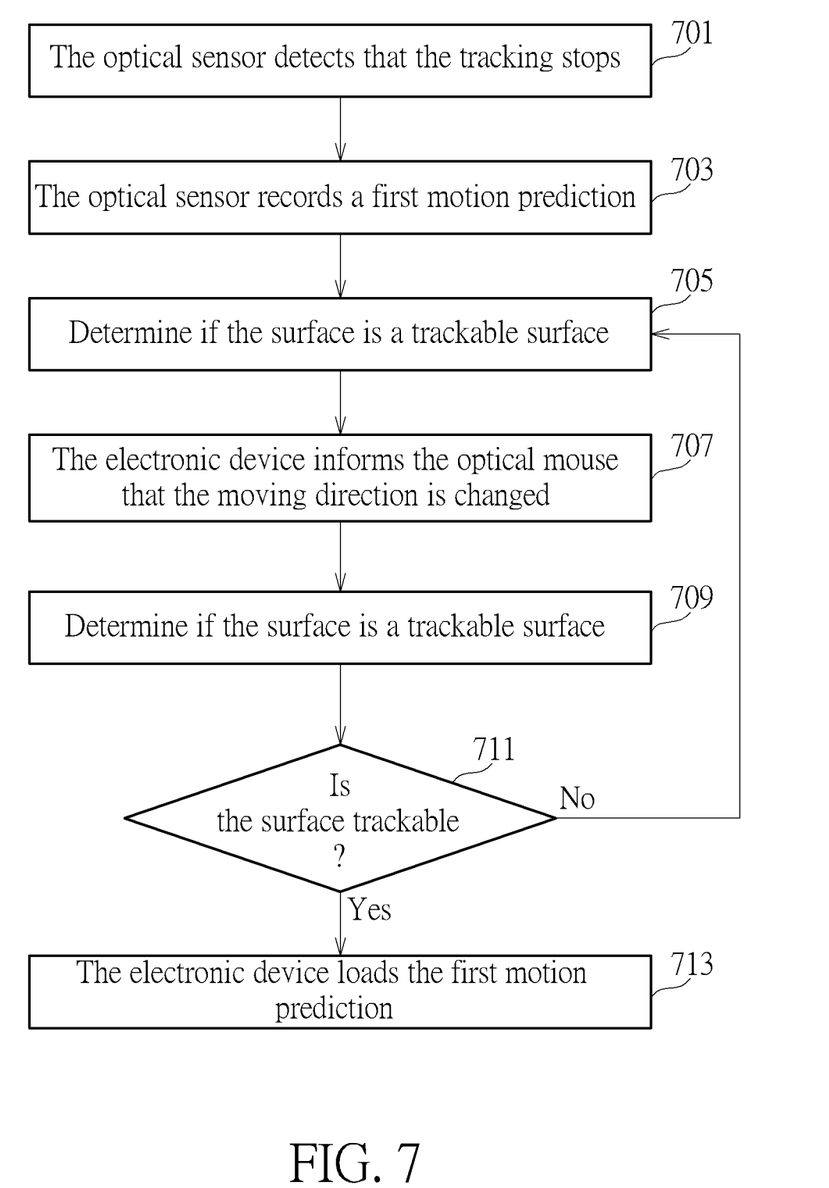
FIG. 7 is a flow chart illustrating the optical navigation method illustrated in FIG. 6.

FIG. 6 is a schematic diagram illustrating an optical navigation method according to another embodiment of the present invention. FIG. 7 is a flow chart illustrating the optical navigation method illustrated in FIG. 6. Please refer to FIG. 7 while referring to FIG. 6.

In one embodiment, the optical mouse 100 continuously performs tracking in the embodiment of FIG. 6. As above-mentioned, the tracking can be successfully performed if the optical mouse 100 is moving on the trackable surface TS_1 or the trackable surface TS_2. However, the tracking stops if the optical mouse 100 is moving on the non-trackable surface NTS (step 701). In the embodiment of FIG. 6, the stop of tracking is detected by the optical sensor 103. In such case, the optical sensor 103 records a first motion prediction which is a last successful motion prediction before the optical mouse 100 enters the non-trackable surface NTS (step 703). The first motion prediction may comprise a motion direction and a motion magnitude. However, the steps 701 and 703 can be performed by the electronic device rather than limited to the optical mouse.

In one embodiment, the optical sensor 103 continuously determines if the surface on which the optical mouse 100 performs a tracking is a trackable surface (step 705), or starts to determine if the surface is a trackable surface when or after the first motion prediction is recorded. Accordingly, the step 703 can be regarded as: "records a first motion prediction which is a last successful motion prediction before the optical mouse 100 determines the surface is non-trackable".

In the step 707, the electronic device 401 detects a moving direction variation of the optical mouse 100. For example, the electronic device 401 acquires a motion direction which is acquired by the optical sensor 103 when the optical mouse 100 is leaving the trackable surface TS_1 and a motion direction which is acquired by the optical sensor 103 when the optical mouse 100 is entering the trackable surface TS_1 again, and computes the moving direction variation according these two motion directions. However, in another embodiment, the moving direction can be detected by the optical sensor 103.

Further, in the step 707, the electronic device 401 informs the optical mouse 100 that the moving direction is changed if the moving direction variation is larger than a direction variation threshold. If the moving direction variation is larger than a direction variation threshold, it means the optical mouse 100 may turn back to the trackable surface TS_1 again after leaves the non-trackable surface NTS. Accordingly, in such case, the optical sensor 103 records a second motion prediction as the first motion prediction (i.e., to replace values of the recorded first motion prediction with values of the second motion prediction). In other words, the optical sensor 103 records the second motion prediction if the surface is trackable (the optical sensor 103 is moving on the trackable surface TS_1) and the optical mouse 100 changes the moving direction (the moving direction variation is larger than a direction variation threshold).

In the step 711, the optical sensor 103 determines if the surface is a trackable surface. The procedure goes back to the step 705 if the surface is still a non-trackable surface (i.e., the optical mouse 100 is still moving on the non-trackable surface NTS). Also, in the step 711, if the surface becomes a trackable surface (i.e., the optical mouse 100 turns back to the trackable surface TS_1), the optical sensor 103 loads the second motion prediction. After that, the optical sensor 103 calculates a new motion prediction according to acquired optical data and the second motion prediction (step 713). By this way, the computation of motion predictions is not interrupted by the non-trackable surface NTS, even if the optical mouse changes it's moving direction.

Please note, in the embodiments of FIG. 6 and FIG. 7, the first motion prediction is firstly recorded and then the second motion prediction is recorded to replace the first motion prediction. However, in one embodiment, the second motion prediction is recorded but the first motion prediction is not recorded. In such embodiment, the second motion prediction which is recorded when the optical mouse 100 is leaving the non-trackable surface NTS and entering the trackable surface TS_1 can be named as a first motion prediction, since the first motion prediction which is recorded when the optical mouse 100 is leaving the trackable surface TS_1 and entering the non-trackable surface NTS is not recorded.

Figure 8:
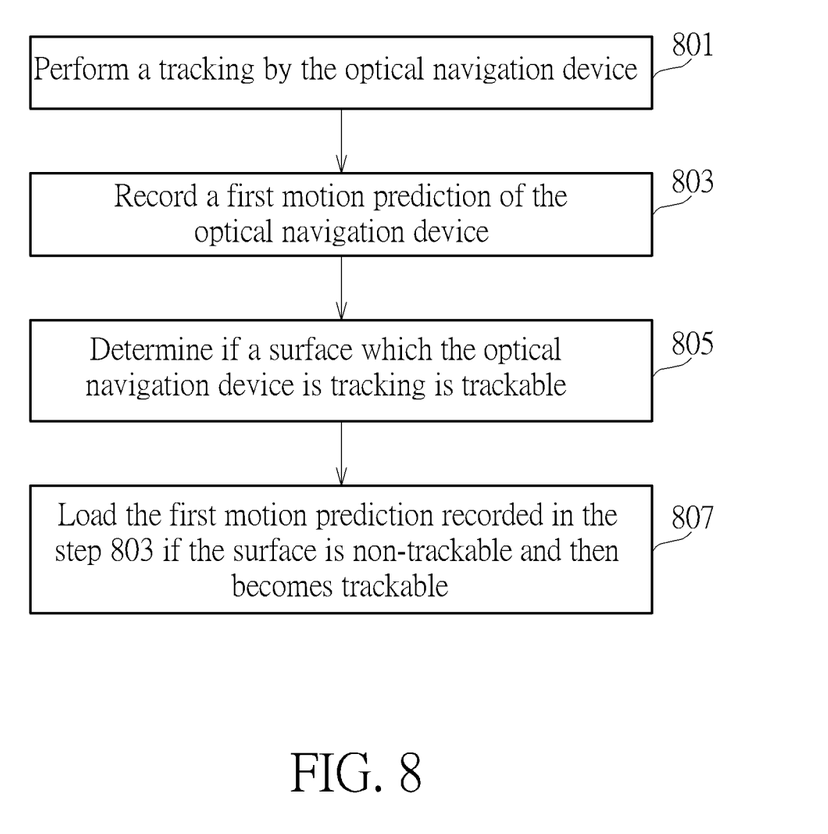
FIG. 8 is a flow chart illustrating a summary of the optical navigation method, according to one embodiment of the present invention.

In view of above-mentioned embodiments, the optical navigation method provided by the present invention can be summarized as the steps illustrated in FIG. 8. FIG. 8 comprises following steps:

Step 801

Perform a tracking by the optical navigation device.

As above-mentioned, the optical navigation device can be an optical mouse.

Step 803

Record a first motion prediction of the optical navigation device.

As above-mentioned, the first motion prediction can be recorded when the tracking stops (e.g., the embodiment of FIG. 2 and FIG. 4), or be recorded when the optical navigation device changes a moving direction (e.g., the embodiment of FIG. 7).

Step 805

Determine if a surface which the optical navigation device is tracking is trackable, such as the step 305 in FIG. 3 or the step 705 in FIG. 7.

In one embodiment, the step 805 is replaced by "Determine if a surface which the optical navigation device is moving on is trackable". In such case, the step 801 can be omitted.

Step 807

Load the first motion prediction recorded in the step 803 if the surface is non-trackable and then becomes trackable.

For example, the optical navigation device moves from the non-trackable surface NTS to the trackable surface TS_2, as shown in FIG. 2 and FIG. 4, or moves from the non-trackable surface NTC to the trackable surface TS_1 again, as shown in FIG. 7.

Other detail steps can be acquired based on above-mentioned embodiments, thus are omitted for brevity here.

In view of above-mentioned embodiments, the motion prediction interrupted by the non-trackable surface can be compensated. Accordingly, the tracking of the optical mouse can be smooth even if the optical mouse moves across a non-trackable surface.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical navigation method, applied to an optical navigation device, comprising:
   (a) recording a first motion prediction of the optical navigation device;
   (b) determining if a surface which the optical navigation device is moving on is trackable; and
   (c) loading the first motion prediction recorded in the step (a) if the surface is non-trackable and then becomes trackable;
   wherein the first motion prediction is a last successful motion prediction before the step (b) determines the surface is non-trackable.

2. The optical navigation method of claim 1, further comprising:
   (d) detecting a moving direction variation of the optical navigation device;
   (e) recording a second motion prediction of the optical navigation device as the first motion prediction if the surface is trackable and the optical navigation device changes the moving direction.

3. The optical navigation method of claim 2, wherein the step (d) detects the moving direction variation via an electronic device connected to the optical navigation device, wherein the electronic device informs the optical navigation device that the optical navigation device changes the moving direction if the moving direction variation is larger than a direction variation threshold.

4. The optical navigation method of claim 1, wherein the step (a) and the step (b) are performed by an optical sensor of the optical navigation device.

5. The optical navigation method of claim 1, wherein the step (a) is performed by an electronic device connected to the optical navigation device, and the step (b) is performed by an optical sensor of the optical navigation device.

6. The optical navigation method of claim 1, further comprising
   performing a tracking on the surface by the optical navigation device before the step (a).

7. The optical navigation method of claim 1, wherein the optical navigation device is an optical mouse.

8. An optical navigation device, comprising:
   a processing circuit; and
   an optical sensor, configured to perform following steps:
   (a) recording a first motion prediction of the optical navigation device;
   (b) determining if a surface which the optical navigation device is moving on is trackable; and
   (c) loading the first motion prediction recorded in the step (a) if the surface is non-trackable and then becomes trackable;
   wherein the first motion prediction is a last successful motion prediction before the step (b) determines the surface is non-trackable.

9. The optical navigation device of claim 8, wherein the optical sensor further performs:
   (d) detecting a moving direction variation of the optical navigation device;
   (e) recording a second motion prediction of the optical navigation device as the first motion prediction if the surface is trackable and the optical navigation device changes the moving direction.

10. The optical navigation device of claim 8, wherein the optical sensor further performs a tracking on the surface before the step (a).

11. The optical navigation device of claim 8, wherein the optical navigation device is an optical mouse.

12. An optical navigation system, comprising:
    an electronic device; and
    an optical navigation device, connected to the electronic device, comprising:
    a processing circuit; and
    an optical sensor;
    wherein the optical sensor determines if a surface which the optical navigation device is moving on is trackable;
    wherein the electronic device records a first motion prediction of the optical navigation device, and loads the first motion prediction which is recorded if the surface is non-trackable and then becomes trackable;
    wherein the first motion prediction is a last successful motion prediction before the optical sensor determines the surface is non-trackable.

13. The optical navigation system of claim 12,
    wherein the electronic device detects a moving direction variation of the optical navigation device;
    wherein the electronic device records a second motion prediction of the optical navigation device as the first motion prediction if the surface is trackable and the optical navigation device changes the moving direction.

14. The optical navigation system of claim 13, wherein the electronic device informs the optical navigation device that the optical navigation device changes the moving direction if the moving direction variation is larger than a direction variation threshold.

15. An optical navigation method, applied to an optical navigation device, comprising:
    (a) recording a first motion prediction of the optical navigation device;
    (b) determining if a surface which the optical navigation device is moving on is trackable; and
    (c) loading the first motion prediction recorded in the step (a) if the surface is non-trackable and then becomes trackable;
    wherein the step (a) and the step (b) are performed by an optical sensor of the optical navigation device.

16. An optical navigation method, applied to an optical navigation device, comprising:
    (a) recording a first motion prediction of the optical navigation device;
    (b) determining if a surface which the optical navigation device is moving on is trackable; and (c) loading the first motion prediction recorded in the step (a) if the surface is non-trackable and then becomes trackable;

wherein the optical navigation method further comprises:

(d) detecting a moving direction variation of the optical navigation device;

wherein the step (a) is performed if the surface is trackable and the optical navigation device changes the moving direction.

17. The optical navigation method of claim 16, wherein the step (d) detects the moving direction variation via an electronic device connected to the optical navigation device, wherein the electronic device informs the optical navigation device that the optical navigation device changes the moving direction if the moving direction variation is larger than the direction variation threshold.

18. An optical navigation device, comprising:

a processing circuit; and an optical sensor, configured to perform following steps:

(a) recording a first motion prediction of the optical navigation device;

(b) determining if a surface which the optical navigation device is moving on is trackable; and (c) loading the first motion prediction recorded in the step (a) if the surface is non-trackable and then becomes trackable wherein the optical sensor further performs:

(d) detecting a moving direction variation of the optical navigation device;

wherein the step (a) is performed if the surface is trackable and the optical navigation device changes the moving direction.

\* \* \* \* \*